United States Patent
Bai et al.

(10) Patent No.: US 11,650,913 B2
(45) Date of Patent: *May 16, 2023

(54) HIGHLY SCALABLE SYSTEM FOR AUTOMATED SDK TESTING

(71) Applicant: Agora Lab, Inc., Santa Clara, CA (US)

(72) Inventors: Jiyu Bai, Shanghai (CN); Yuhua Gong, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/891,324

(22) Filed: Aug. 19, 2022

(65) Prior Publication Data
US 2023/0015745 A1    Jan. 19, 2023

Related U.S. Application Data

(63) Continuation of application No. 16/889,399, filed on Jun. 1, 2020, now Pat. No. 11,455,237.

(51) Int. Cl.
| | | |
|---|---|---|
| *G06F 9/44* | (2018.01) | |
| *G06F 9/445* | (2018.01) | |
| *G06F 9/455* | (2018.01) | |
| *G06F 11/36* | (2006.01) | |
| *G06F 9/54* | (2006.01) | |

(52) U.S. Cl.
CPC .......... *G06F 11/3688* (2013.01); *G06F 9/546* (2013.01); *G06F 11/3664* (2013.01); *G06F 11/3684* (2013.01); *G06F 11/3692* (2013.01)

(58) Field of Classification Search
CPC ............ G06F 11/3688; G06F 11/3664; G06F 11/3684; G06F 11/3692; G06F 9/546
See application file for complete search history.

(56) References Cited

U.S. PATENT DOCUMENTS

| | | |
|---|---|---|
| 9,292,414 B2 | 3/2016 | Kiel et al. |
| 9,805,202 B2 | 10/2017 | Medeiros et al. |
| (Continued) | | |

FOREIGN PATENT DOCUMENTS

| | | |
|---|---|---|
| CN | 101866315 | 10/2010 |
| CN | 101930400 | 7/2013 |
| (Continued) | | |

OTHER PUBLICATIONS

Hamza Ed-douibi, Automatic Generation of Test Cases for REST APIs: a Specification-Based Approach, 2018, pp. 1-10. https://ieeexplore.ieee.org/document/8536162?source=IQplus (Year: 2018).*

(Continued)

*Primary Examiner* — Mongbao Nguyen
(74) *Attorney, Agent, or Firm* — The Law Offices of Konrad Sherinian, LLC; Depeng Bi (57) ABSTRACT

A highly scalable automated testing system includes an automated testing controller, an automated testing message server and an automated testing message terminal running on a set of automated testing target devices. The controller and the terminals register themselves with the message server. A testing case is programmed for testing an SDK on a number of target devices concurrently and transformed into a set of command messages in JSON message format. The controller sends the set of messages to the message server. The message server then distributes the set of command messages to the terminals. In response, the terminal calls corresponding APIs of the SDK. The APIs called can be the same or different between the devices within the set of target devices. The SDK returns a result that is forwarded to the server. The server sends the results from the target devices to the controller. The controller verifies the results.

13 Claims, 8 Drawing Sheets

(56) References Cited

U.S. PATENT DOCUMENTS

| | | | |
|---|---|---|---|
| 10,528,454 B1 | 1/2020 | Baraty | |
| 10,747,651 B1* | 8/2020 | Vanderwall | G06F 11/3684 |
| 2015/0128103 A1* | 5/2015 | Stratton | G06F 8/00 |
| | | | 717/100 |
| 2017/0060568 A1* | 3/2017 | Seibert, Jr. | G06F 8/71 |
| 2018/0206136 A1 | 7/2018 | Chow et al. | |
| 2018/0253373 A1* | 9/2018 | Mathur | G06F 11/3692 |
| 2019/0188288 A1* | 6/2019 | Holm | G06F 16/289 |
| 2020/0401506 A1 | 12/2020 | Sathianarayanan et al. | |
| 2021/0081308 A1* | 3/2021 | Golubev | G06F 11/3688 |
| 2021/0318945 A1* | 10/2021 | Subbunarayanan | G06F 11/3692 |
| 2022/0091837 A1* | 3/2022 | Chai | G06F 8/36 |

FOREIGN PATENT DOCUMENTS

| | | | | |
|---|---|---|---|---|
| CN | 105718251 | | 6/2016 | |
| CN | 105718521 A | * | 6/2016 | |
| CN | 107145439 A | * | 9/2017 | G06F 11/3672 |
| CN | 109376088 | | 2/2019 | |
| CN | 110659209 A | * | 1/2020 | |

OTHER PUBLICATIONS

Hamza Ed-douibi, Automatic Generation of Test Cases for REST APIs: a Specification-Based Approach, 2018, pp. 181-190. https://ieeexplore.ieee.org/stamp/stamp.jsp?tp=&arnumber=8536162 (Year: 2018).*

* cited by examiner

Prior Art

```
def test_two_devices(self):
    self.device_1=WayangRobotAndroidPro()
    self.device_2=WayangRobotIOS()

device_1=self.device_1
    device_2=self.device_2 device_1.create(wc.APP_ID.LIVE_STATIC)
    device_1.setChannelProfile(0)
    device_1.setClientRole(1)
    device_1.joinChannel(self.channel_name, self.primary_uid device_2.create(wc.APP_ID.LIVE_STATIC)
    device_2.setChannelProfile(0)
    device_2.setClientRole(1)
    device_2.joinChannel(self.channel_name, self.primary_uid)
```

FIG. 6

```
def test_two_devices(self):
    self.device_1=WayangRobotAndroidPro()
    self.device_2=WayangRobotIOS()

device_1=self.device_1
    device_2=self.device_2 device_1.create(wc.APP_ID.LIVE_STATIC)
    device_1.setChannelProfile(0)
    device_1.setClientRole(1)
    device_1.joinChannel(self.channel_name, self.primary_uid device_2.sharedEngineWithAppId(wc.APP_ID.LIVE_STATIC)
    device_2.setChannelProfile(0)
    device_2.setClientRole(1)
    device_2.enableVideo()
    device_2.joinChannelByToken(self.channel_name, self.primary_uid)
```

FIG. 7

```
def test_four_devices_join_the_same_channel(self):
    self.device_1=WayangRobotAndroidPro()
    self.device_2=WayangRobotIOS()
    self.device_3=WayangRobotWindowsPro()
    self.device_4=WayangRobotWindowsPro2()

device_1=self.device_1
    device_2=self.device_2
    device_3=self.device_3
    device_4=self.device_4 device_1.create(wc.APP_ID.LIVE_STATIC)
    device_1.setChannelProfile(0)
    device_1.setClientRole(1)
    device_1.joinChannel(self.channel_name, self.primary_uid device_2.sharedEngineWithAppId(wc.APP_ID.LIVE_STATIC)
    device_2.setChannelProfile(0)
    device_2.setClientRole(1)
    device_2.enableVideo()
    device_2.joinChannelByToken(self.channel_name, self.primary_uid)

device_3.createAgoraRtcEngine(wc.APP_ID.LIVE_STATIC)
    device_3.setChannelProfile(0)
    device_3.setClientRole(1)
    device_3.enableVideo()
    device_3.enableAudio()
    device_3.joinChannel(self.channel_name, self.primary_uid)

device_4.createAgoraRtcEngine(wc.APP_ID.LIVE_STATIC)
    device_4.setChannelProfile(0)
    device_4.setClientRole(1)
    device_4.enableVideo()
    device_4.enableAudio()
    device_4.joinChannel(self.channel_name, self.primary_uid)
```

FIG. 8

```
JSON message for the API create:
{
  "type":1,
  "device":"device_1",
  "cmd" :"create",
  "info":{
     "context":"",
     "appId":"",
     "handler":""
  },
  "extra":{
  }
}
```

```
JSON message for the API enableVideo:
{
  "type":1,
  "device":"SJ0127",
  "cmd" :"enableVideo",
  "info":{
  },
  "extra":{
  }
}
```

```
JSON message for the API disableVideo:
{
  "type":1,
  "device":"SJ0127",
  "cmd" :"disableVideo",
  "info":{
  },
  "extra":{
  }
}
```

```
JSON message for the API setVideoProfile:
{
  "type":1,
  "device":"SJ0127",
  "cmd" :"setVideoProfile",
  "info":{
     "profile":,
     "swapWidthAndHeight":"True | False"
  },
  "extra":{
  }
}
```

FIG. 9

HIGHLY SCALABLE SYSTEM FOR AUTOMATED SDK TESTING

CROSS REFERENCE TO RELATED APPLICATIONS

This application is a continuation of co-pending U.S. patent application Ser. No. 16/889,399, entitled "HIGHLY SCALABLE SYSTEM AND METHOD FOR AUTOMATED SDK TESTING", filed Jun. 1, 2020, assigned to Agora Lab, Inc. of Santa Clara, Calif., which is hereby incorporated by reference in its entirety.

FIELD OF THE DISCLOSURE

The present invention generally relates to computer software testing technologies, and more particularly relates to automated computer software testing. More particularly still, the present disclosure relates to a highly scalable system and method for automated testing of software development kits.

DESCRIPTION OF BACKGROUND

Computer software providers usually provide their computer software in the form of a software development kit (SDK). An SDK exposes its functionality through application programming interfaces (APIs). The SDK functionality can be related to, for instance, data services, map services, multimedia services, etc. The APIs allow other computer software developers to develop new computer software, such as a mobile app. For ease of reference, the computer software using the SDK is referred to herein as computer software application (CSA). When the computer software application is in operation, the executable form of the SDK and the computer software application are both executed by the hosting computer, such as a laptop computer, a desktop computer, a smart phone, a server computer, a tablet computer, etc. An SDK is generally intended for tens, hundreds, thousands, even millions, of computer software developers. Effective and thorough testing of the SDK to assure that it provides the capabilities it is designed for is thus critical and required.

Figure 1:
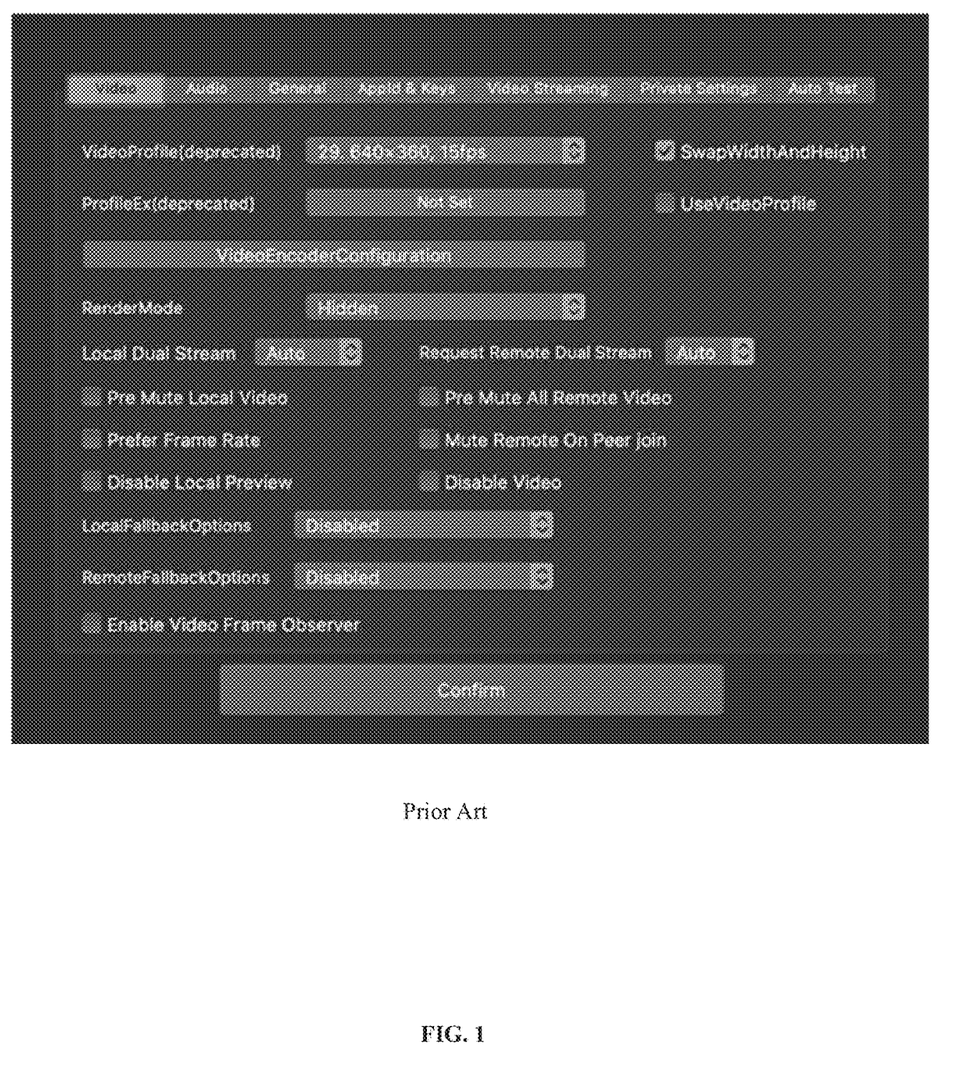
FIG. 1 is a prior art SDK testing user interface.

The conventional system and method for testing an SDK is to program different testing user interfaces (UIs). By operating the UIs, a tester accesses the APIs of the SDK for the purpose of testing the functionality of the SDK. The traditional UI based SDK testing has numerous drawbacks. First, complex testing UIs need to be developed. A prior art SDK testing UI is illustrated in FIG. 1. Second, the UI based testing lacks automation, and thus is ineffective. Third, each time an API is revised or a new API is added, the corresponding testing UIs need to be revised in response. Fourth, the UI based testing method lacks the capability for stress testing of the SDK. For instance, one stress testing is calling a particular API many times during a very short time period. Fifth, whenever a new combination of the APIs is tested, a new testing UI needs to be programmed. Sixth, the conventional UI based SDK testing is unable to allow a tester to test an SDK on multiple electronic devices at the same time. In other words, it lacks the highly desirable scalability. For instance, a SDK provider or user usually desires to the test the SDK on target devices of different hardware configurations, different types of operating systems, different versions of different operating systems, etc.

The multiple electronic devices can include, for example, two, three, eight, tens, hundreds or thousands of devices. The electronic devices can computers, such as laptop computers, desktop computers, smart phones, server computers, and tablet computers. The computers run iOS™, Windows™, Android™, iPadOS™, OS X™ or other operating systems. The electronic devices can also be other types of computing devices with interconnections over the Internet. The electronic devices are also referred to herein as Internet of Things (IOTs). There are many other shortcomings in UI based SDK testing as well.

Accordingly, there is a need for an automated testing system and method for testing SDKs. In particular, there is a need for a highly scalable system and method for automated testing of an SDK in a concurrently manner.

SUMMARY OF THE DISCLOSURE

Generally speaking, pursuant to the various embodiments, the present disclosure provides a method for automated testing of an SDK. The method is performed by a highly scalable automated SDK testing system and includes registering with an automated SDK testing message server as an automated SDK testing controller over the Internet, and registering with the automated SDK testing message server by a set of automated SDK testing target devices over the Internet. The set of automated SDK testing target devices includes at least two automated SDK testing target devices. The method also includes programming an automated testing use case calling a set of APIs on each automated SDK testing target device within the set of automated SDK testing target devices, thereby forming a list of sets of APIs, and transforming each set of APIs within the list of sets of APIs into a set of automated SDK testing command messages. In one implementation, each automated SDK testing command message is a JSON message. A list of sets of JSON messages is thus formed. In addition, the method includes sending the list of sets of JSON messages to the automated SDK testing message server by the automated SDK testing controller over the Internet, forwarding each set of JSON messages within the list of sets of JSON messages to an automated SDK testing message terminal running a corresponding automated SDK testing target device within the set of automated SDK testing target devices over the Internet, and on each automated SDK testing target device within the set of automated SDK testing target devices, the automated SDK testing message terminal calling a corresponding set of APIs within the list of sets of APIs against the SDK. Moreover, the method includes executing the set of APIs by the SDK to generate a result, the automated SDK testing message terminal returning the result to the automated SDK testing message server over the Internet, the automated SDK testing message server forwarding the result to the automated SDK testing controller, thereby forming a set of results, and the automated SDK testing controller processing the set of results. The sets of APIs within the list of sets of APIs maybe not the same. They can also be the same. In addition, some sets of APIs within the list of sets of APIs can be the same while others are different. The set of automated SDK testing target devices includes at least one automated SDK testing target device that is an Internet of Things device. The set of automated SDK testing target devices includes at least one automated SDK testing target device that is an Android device, an iOS device, a Windows device, or an iPadOS device.

Further in accordance with the present teachings is a highly scalable system for automated testing of a Software Development Kit (SDK). The highly scalable system includes an automated testing controller. The automated testing controller is a computer program adapted to be executed on an automated SDK testing controller computer. The automated SDK testing controller computer includes a processing unit; some amount of memory operatively coupled to the processing unit; a networking interface operatively coupled to the processing unit for accessing the Internet; a display screen operatively coupled to the processing unit; and a user input interface operatively coupled to the processing unit. The highly scalable system also includes an automated testing message server and an automated testing message terminal. The automated testing message server is a server computer software application running on a server computer. The automated testing message terminal is adapted to be executed on a set of automated testing target devices. The set of automated testing target devices includes at least two automated testing target devices. The automated testing message terminal is a computer software program. The automated testing message terminal is further adapted to communicate with the automated SDK testing message server. The automated testing controller is adapted to register with the automated testing message server as an automated SDK testing controller over the Internet. The automated testing message terminal is adapted to register with the automated testing message server over the Internet from the set of automated testing target devices. The automated testing controller is adapted to program an automated testing use case calling a set of Application Programming Interfaces (APIs) on each automated testing target device within the set of automated testing target devices, thereby forming a list of sets of APIs. The automated testing controller is adapted to transform each set of APIs within the list of sets of APIs into a set of automated SDK testing command messages as JavaScript Object Notation (JSON) messages, thereby forming a list of sets of JSON messages. The automated testing controller is adapted to send the list of sets of JSON messages to the automated testing message server over the Internet. The automated testing message server is adapted to forward each set of JSON messages within the list of sets of JSON messages to the automated testing message terminal running on a corresponding automated testing target device within the set of automated testing target devices over the Internet. On each automated testing target device within the set of automated testing target devices, the automated testing message terminal is adapted to call a corresponding set of APIs within the list of sets of APIs against the SDK, wherein the SDK is adapted to execute the set of APIs by the SDK to generate a result. The automated testing message terminal is adapted to return the result to the automated testing message server over the Internet. The automated testing message server is adapted to forward the result to the automated testing controller, thereby forming a set of results. The automated testing controller is adapted to process the set of results. In one implementation, the sets of APIs within the list of sets of APIs are not the same. In one implementation, two or more sets of APIs within the list of sets of APIs are the same. In one implementation, the sets of APIs within the list of sets of APIs are the same. The set of automated testing target devices includes at least one automated testing target device that is an Internet of Things device. The set of automated testing target devices includes at least one automated testing target device that is an Android device, an iOS device, a Windows device, or an iPadOS device.

Further in accordance with the present teachings is a highly scalable system for automated testing of a Software Development Kit (SDK). The highly scalable system includes an automated testing controller, an automated testing message server and an automated testing message terminal. The automated testing controller is a computer program adapted to be executed on an automated SDK testing controller computer. The automated SDK testing controller computer includes a processing unit; some amount of memory operatively coupled to the processing unit; a networking interface operatively coupled to the processing unit for accessing the Internet; a display screen operatively coupled to the processing unit; and a user input interface operatively coupled to the processing unit. The automated testing message server is a server computer software application running on a server computer. The automated testing message terminal is adapted to be executed on a set of automated testing target devices. The set of automated testing target devices includes at least two automated testing target devices. The automated testing message terminal is a computer software program. The automated testing message terminal is further adapted to communicate with the automated testing message server. The automated testing controller is adapted to register with the automated testing message server as an automated SDK testing controller over the Internet. The automated testing message terminal is adapted to register with the automated testing message server over the Internet from the set of automated testing target devices. The automated testing controller is adapted to program an automated testing use case calling a set of Application Programming Interfaces (APIs) on each automated testing target device within the set of automated testing target devices, thereby forming a list of sets of APIs. The automated testing controller is adapted to transform each set of APIs within the list of sets of APIs into a set of automated SDK testing command messages. The automated testing controller is adapted to send the list of sets of automated SDK testing command messages to the automated testing message server over the Internet. The automated testing message server is adapted to forward each set of automated SDK testing command messages within the list of sets of automated SDK testing command messages to the automated testing message terminal running a corresponding automated testing target device within the set of automated testing target devices over the Internet. On each automated testing target device within the set of automated testing target devices. The automated testing message terminal is adapted to call a corresponding set of APIs within the list of sets of APIs against the SDK, wherein the SDK is adapted to concurrently execute the set of APIs by the to generate a result. The automated SDK testing message terminal is adapted to return the result to the automated testing message server over the Internet. The automated SDK testing message server is adapted to forward the result to the automated testing controller, thereby forming a set of results. The automated SDK testing controller is adapted to process the set of results. In one implementation, the sets of APIs within the list of sets of APIs are not the same. In one implementation, two or more sets of APIs within the list of sets of APIs are the same. In one implementation, the sets of APIs within the list of sets of APIs are the same. The set of automated testing target devices includes at least one automated testing target device that is an Internet of Things device. The set of automated testing target devices includes at least one automated testing target device that is an Android device, an iOS device, a Windows device, or an iPadOS device. Each automated SDK testing command message within the list of sets of automated SDK testing command messages is a JavaScript Object Notation (JSON) message.

BRIEF DESCRIPTION OF THE DRAWINGS

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 2:
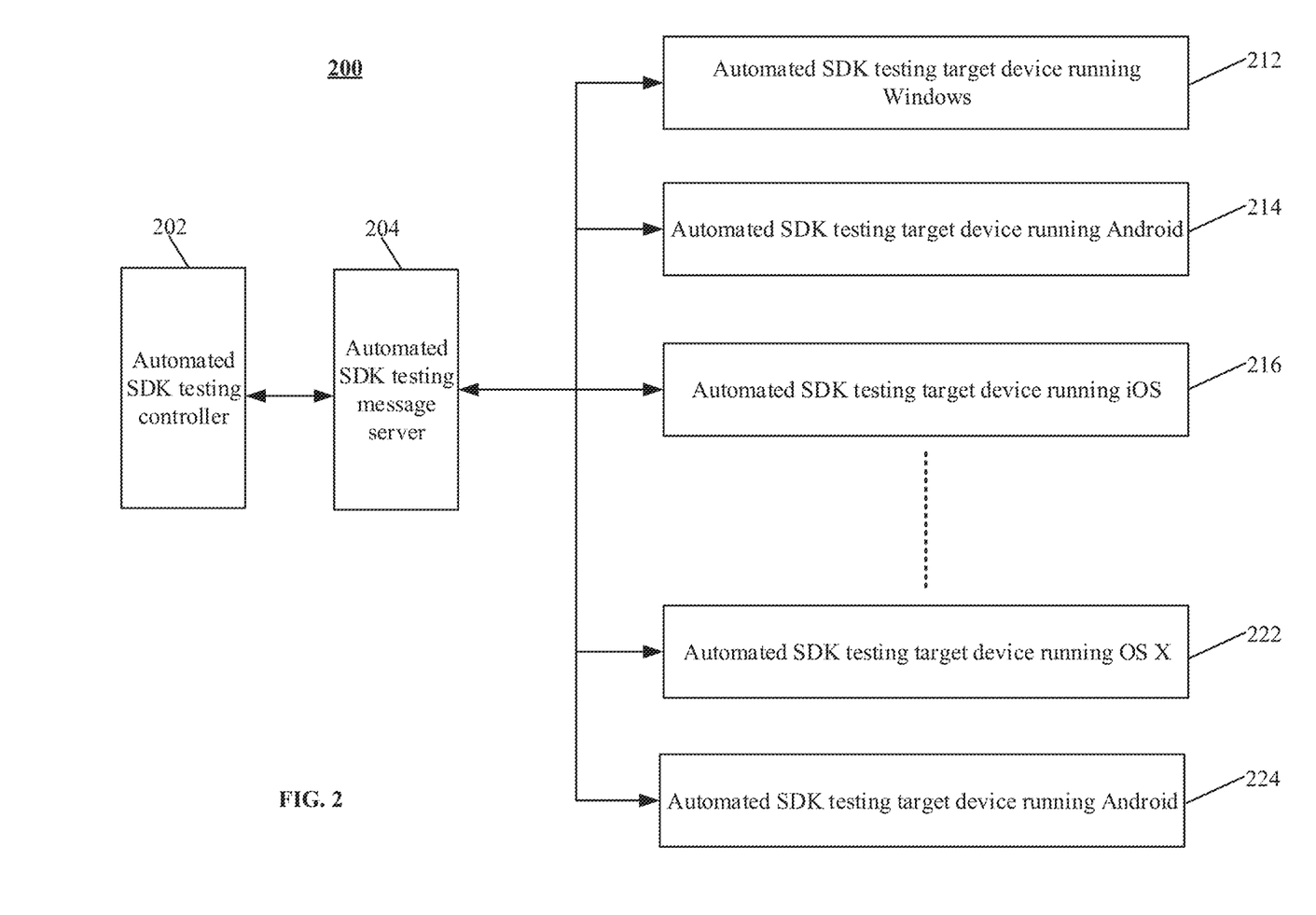
FIG. 2 is an illustrative block diagram of a highly scalable system for automated testing of SDKs in accordance with the teachings of this disclosure.

Turning to the Figures and to FIG. 2 in particular, an illustrative block diagram of a highly scalable automated SDK testing system is shown and generally indicated at 200. The highly scalable automated SDK testing system 200 includes an automated testing controller 202, an automated testing message server 204 and a set (meaning one or more) of automated testing target devices 212,214,216,222,224. The automated SDK testing controller 202 is an SDK testing computer program running on a computer, such as a laptop computer, a desktop computer, a tablet computer, a smartphone, etc. The automated SDK testing controller computer includes a processing unit, some amount of memory operatively coupled to the processing unit, a networking interface operatively coupled to the processing unit for accessing the Internet, a display screen, and a user input interface (such as a keyboard and a mouse). The automated SDK testing message server 204 is a server computer software application running on a server computer. The server computer can be a cloud server system, a standalone server, or a server farmer.

The automated testing message server 204 bridges and manages the communication between the automated testing controller 202 and the set of SDK testing target devices 212-224. The communication is over the Internet. The automated testing controller 202 and the set of SDK testing target devices 212-224 access the Internet via Wi-Fi networks, public cellular phone networks, or other types of local area networks.

Though only five devices 212-224 are shown, the set of automated SDK testing target devices may include any number of devices in accordance with the present teachings. The automated SDK testing target devices 212-224 can be laptop computers, desktop computers, tablet computers, smartphones, IOT devices, etc. Each of them includes a processing unit, some amount of memory operatively coupled to the processing unit, a networking interface operatively coupled to the processing unit for accessing the Internet. They each can also include an audio input interface (such as a microphone), an audio output interface (such as a speaker), a display screen, a video input interface (such as a camera), and/or a user input interface (such as a touch screen, a keyboard, a mouse).

The devices 212-224 may differ in the types of operating systems running on the same, the versions of these operating systems, the manufactures of them, the types of hardware (such as types of CPUs) of the same, the intended operation environments (such as different temperatures), different categories of electronic devices (such as smartphone, tablet computers, IOT devices), etc. Simultaneously testing a variety of electronic devices is highly desirable for SDK providers. For example, an SDK for accessing a multimedia service needs to be tested on different operating systems (such as Android and iOS), different versions of the same operating system, different categories of electronic devices (such as tablet computers and smartphones), electronic devices with different types of CPUs (meaning central processing units) and audio and video components, etc. Repeating the same testing cases on all these devices is time consuming and resource consuming, and thus not desirable. The automated SDK testing system 200 provides a solution to this problem by providing a highly scalable SDK testing system that can concurrently test multiple electronic devices at the same time using a single automated testing controller 202.

Figure 3:
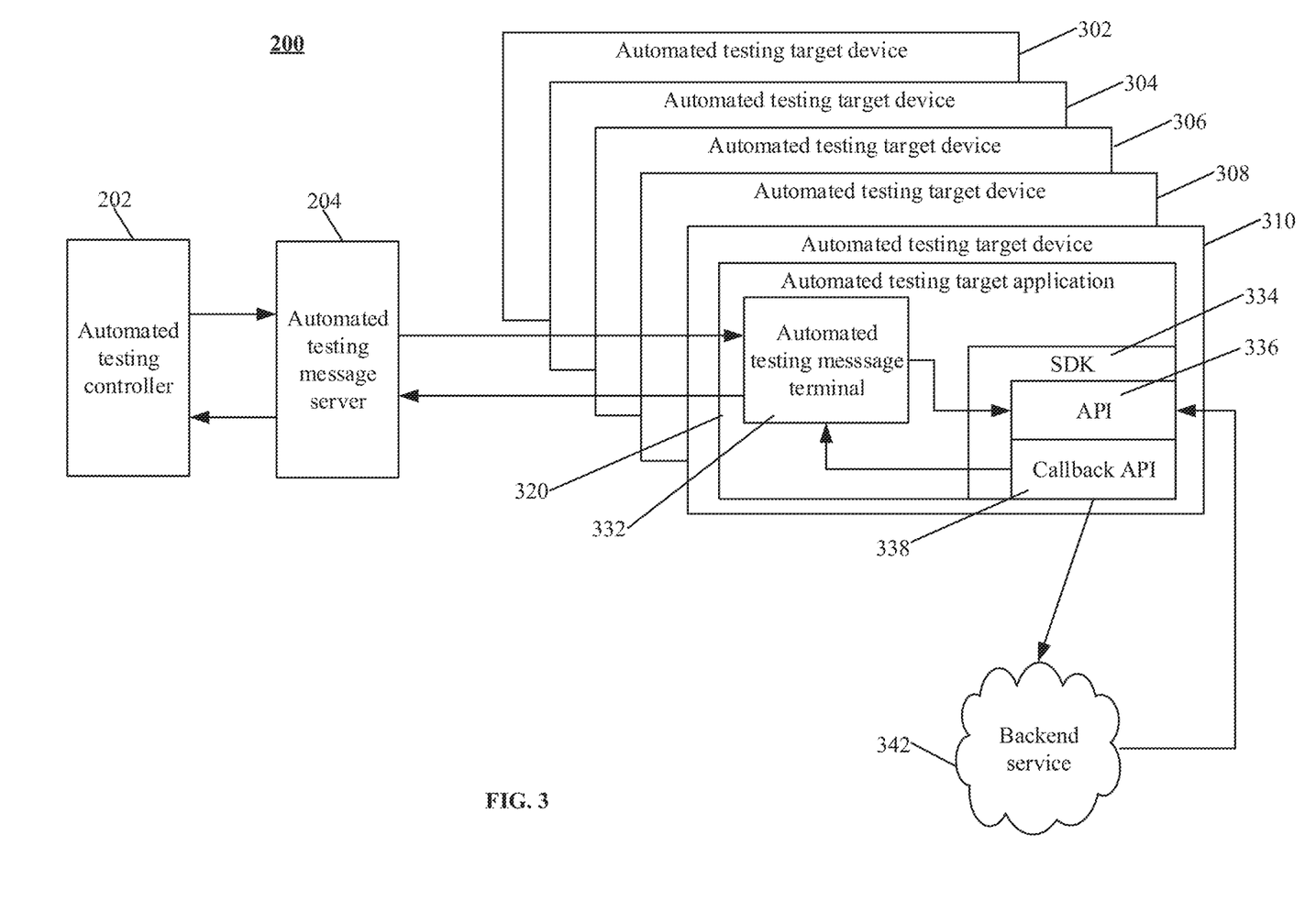
FIG. 3 is an illustrative block diagram of a highly scalable system for automated testing of SDKs in accordance with this disclosure.

The highly scalable automated SDK testing system 200 is further illustrated by reference to FIG. 3. Referring to FIG. 3, the set of automated testing target devices is represented by and indicated at 302,304,306,308,310. Each of the set of automated SDK testing target devices 302-310 (such as the devices 212-224) includes an automated SDK testing target device software application 320. The application 320 includes an automated SDK testing message terminal 332 that accesses the SDK 334 being tested. The automated SDK testing message terminal 332 is a computer software program communicating with the automated SDK testing message server 204. The SDK 334 provides an API component 336, and may also provide a callback API component 338. The SDK 334 accesses a backend service 342 for providing a service to the automated testing controller 202. The service can be, for example, a data service, a map service, a multimedia service, etc. The backend service 342 can be provided by a cloud server over the Internet, the devices 302-310 themselves, a third-party system, etc.

Figure 4:
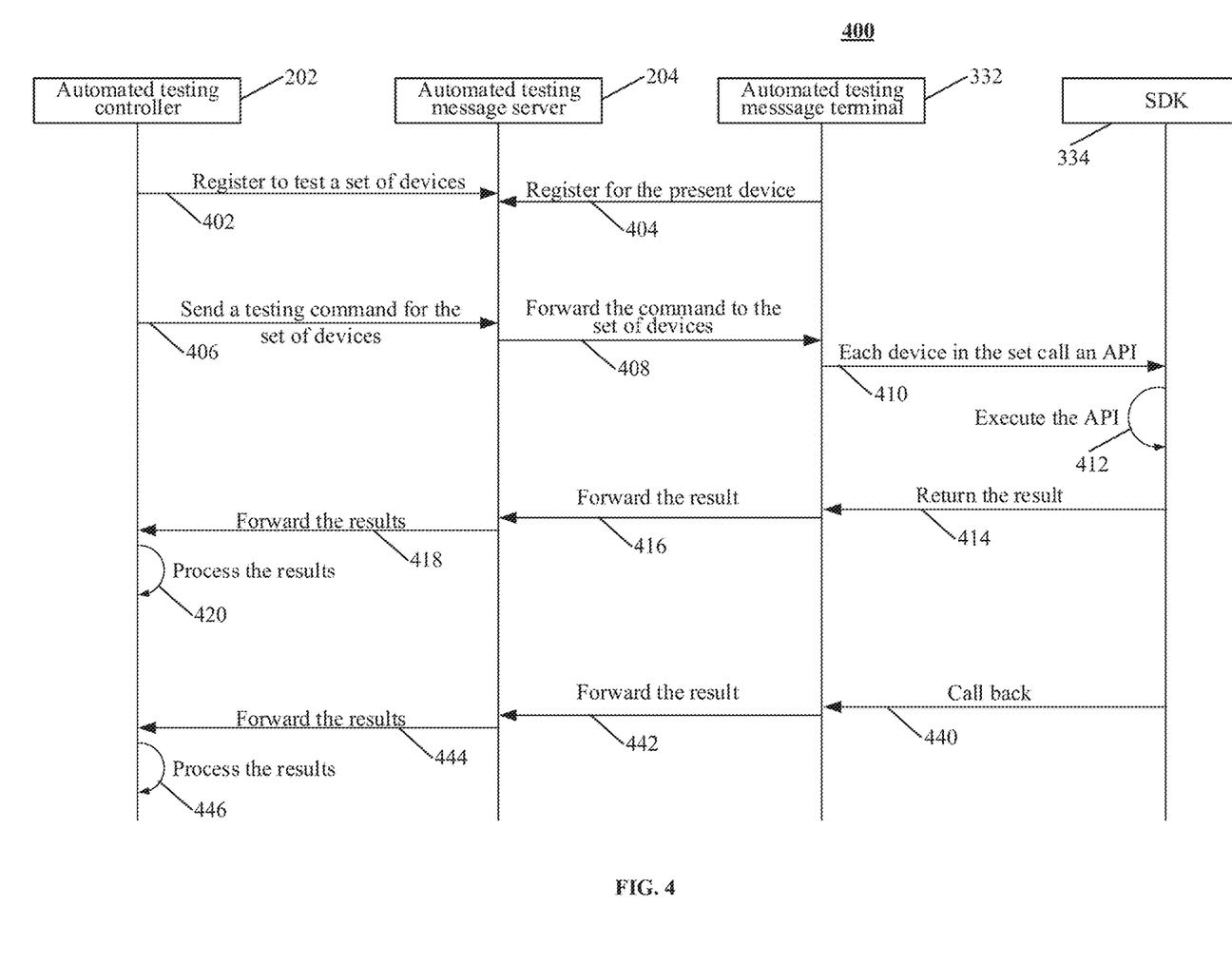
FIG. 4 is a simplified sequence diagram illustrating a process performed by a highly scalable system for automated testing of SDKs in accordance with this disclosure.

The operation of the highly scalable automated SDK testing system 200 for performing the highly scalable automated SDK testing is further illustrated by reference to FIG. 4. Referring now to FIG. 4, a sequence diagram illustrating a process by which the system 200 performs the highly scalable automated SDK testing is shown and generally indicated at 400. At 402, the automated testing controller 202 communicates with the automated testing control server 204 to register for testing a set of devices, such as the device 302-310. The registration message indicates the controller 202. In a further implementation, the registration message also indicates the set of devices 302-310. Each device can be identified by a device ID. At 404, the automated testing message terminal 332 running on each of the automated SDK testing target devices 302-310 registers itself with the automated SDK testing message server 204. Each registration message indicates the corresponding device. Once the controller 202 and the devices 302-310 have registered with the server 204, the controller 202 can automate testing of the SDK 334 running on the devices 302-310 in parallel. By the registration, the automated SDK testing target devices 302-310 subscribe testing command messages from the automated testing message server 204.

At 406, the automated SDK testing controller 202 sends a testing command for the set of devices 302-310 to the automated SDK testing message server 204. In response, at 408, the automated SDK testing message server 204 publishes the testing command message to the subscribing devices 302-310. In means that the automated SDK testing message server 204 forwards the testing command to the automated SDK testing message terminal 332 running on the devices 302-310. The testing command message may not be sent to each of the subscribing devices 302-310. Rather, it is sent to the subscribing devices that the message is intended for. Responsive to the testing command, at 410, the automated SDK testing message terminal 332 calls one or more APIs exposed by the SDK 334. At 412, the SDK 334 executed the one or more APIs. The execution may involve accessing the backend service 342.

At 414, the SDK 334 returns the result of the execution of the called one or more APIs to the terminal 332. At 416, the terminal 332 then forwards the result to the server 204. At 418, the server 204 then forwards the result from each terminal 332 to the controller 202. In one implementation, the results are aggregated and forwarded to the controller in a single packaged message. Alternatively, they can be provided to the controller 202 separately.

The SDK 334 may implement callback APIs. When such APIs are tested and called, the SDK 334 responds in an asynchronous manner. When the result is ready, at 440, the result is returned to the terminal 332. At 442, the terminal forwards the result to the server 204. At 444, the server provides the results from the devices 302-310 to the controller 202. At both 420 and 446, the controller processes the results respectively. For instance, at 420 (and 446), the controller checks the results to confirm whether they are the desired results. The verification process may also involve an interaction between the tester and the controller 202 to verify the results. The verification process can also be automatically done by the controller 202.

Figure 5:
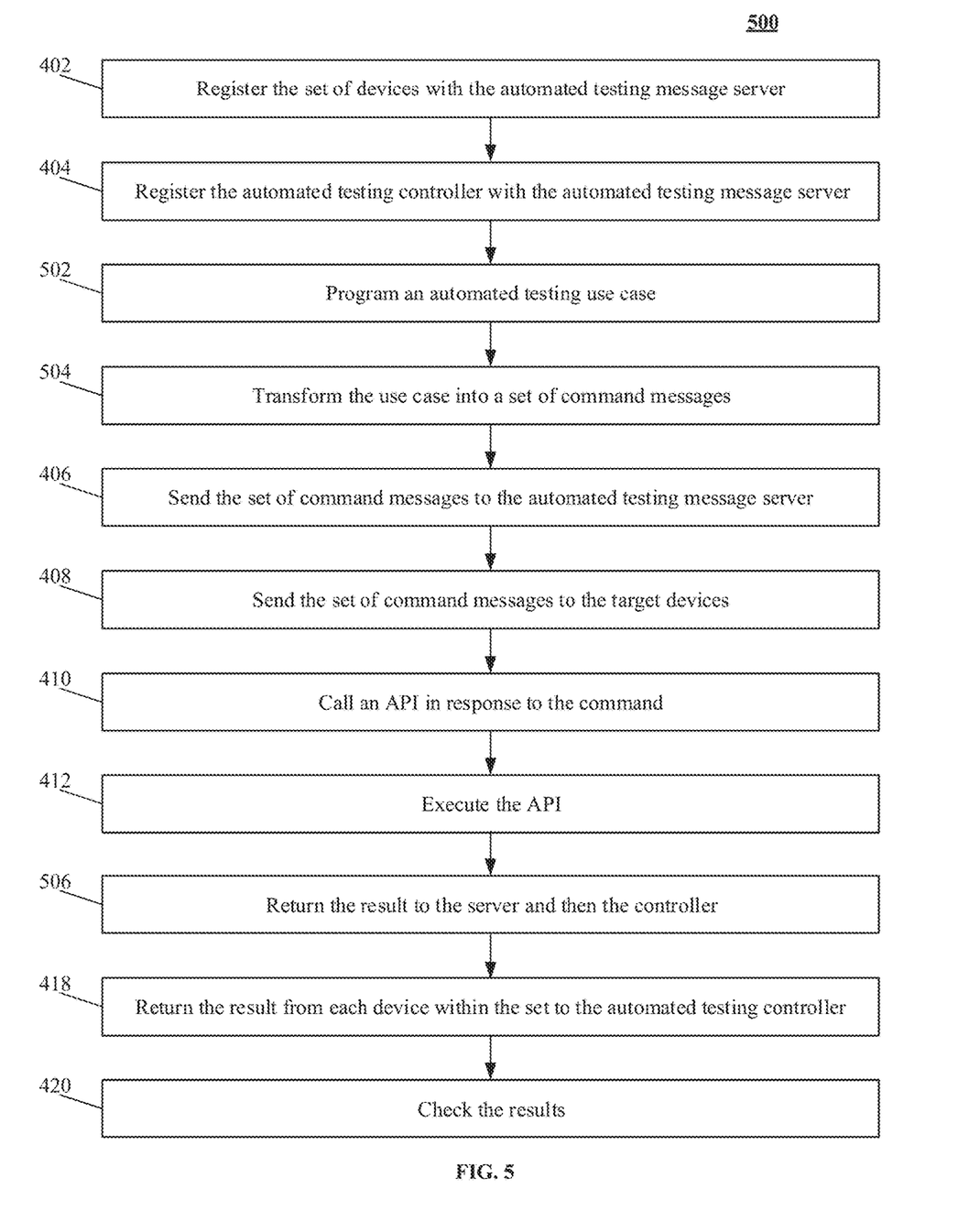
FIG. 5 is a simplified flowchart diagram illustrating a process performed by a highly scalable system for automated testing of SDKs in accordance with this disclosure.
Figure 7:
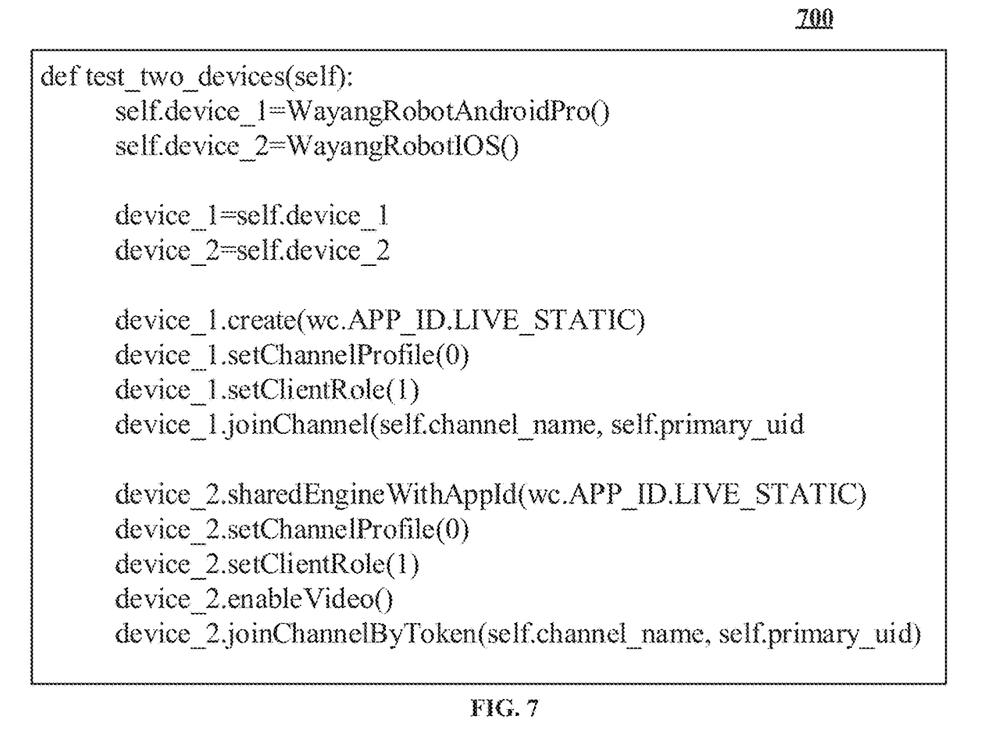
FIG. 7 is an illustrative SDK testing use case in accordance with this disclosure.
Figure 8:
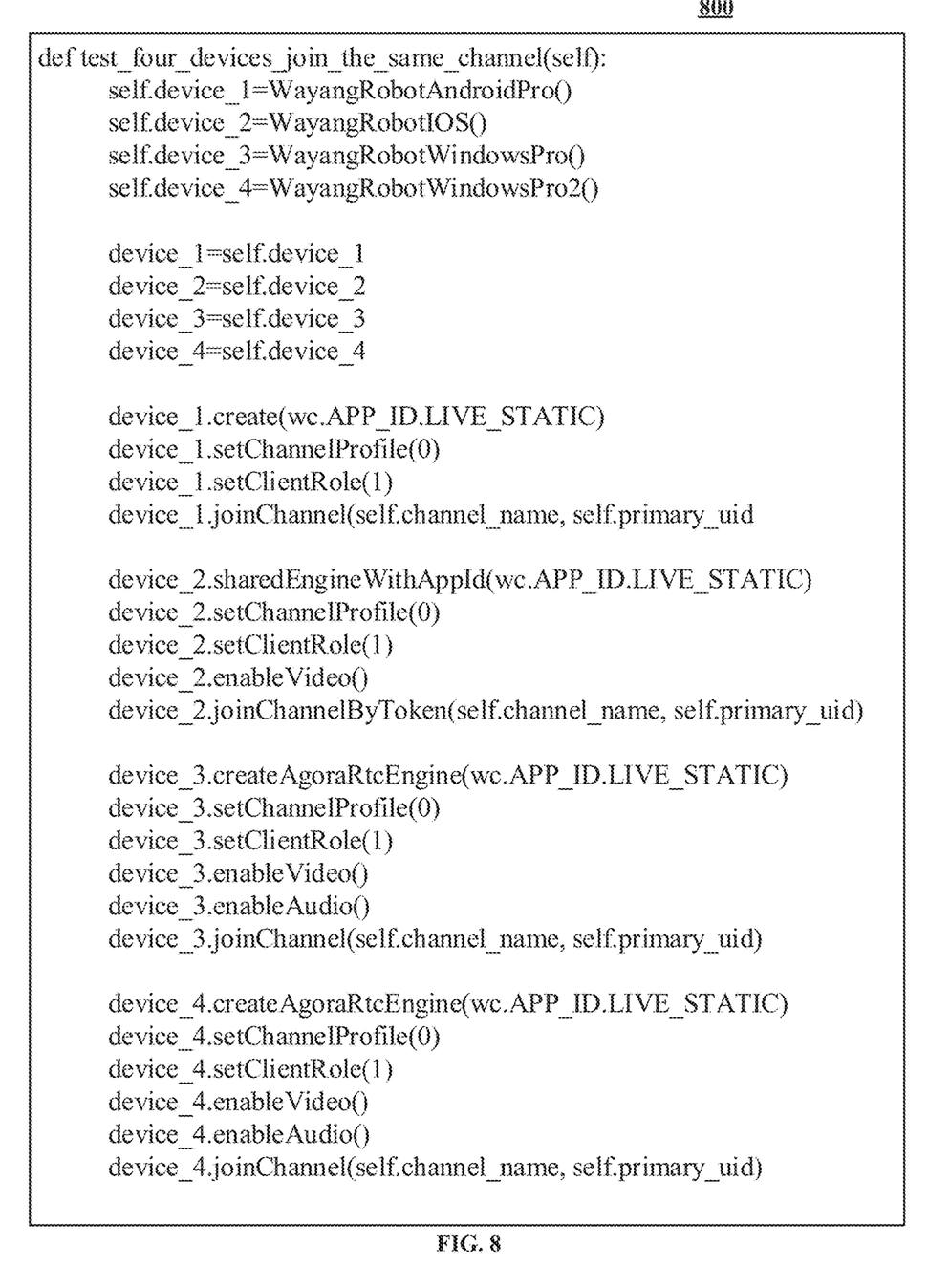
FIG. 8 is an illustrative SDK testing use case in accordance with this disclosure.

The process by which the system 200 performs the highly scalable automated SDK testing is further shown in FIG. 5 and generally indicated at 500. Referring to FIG. 5, a flowchart depicting the process starts with the elements 402 and 404. At 402, the set of devices 302-310 register with the server 204 to subscribe for automated SDK testing messages and establish a link with the server 204. At 404, the controller 202 registers with the server 204 and establishes a link with the server 204. At 502, a tester programs an automated SDK testing use case. Illustrative SDK testing use cases are shown in FIGS. 6, 7 and 8.

Figure 6:
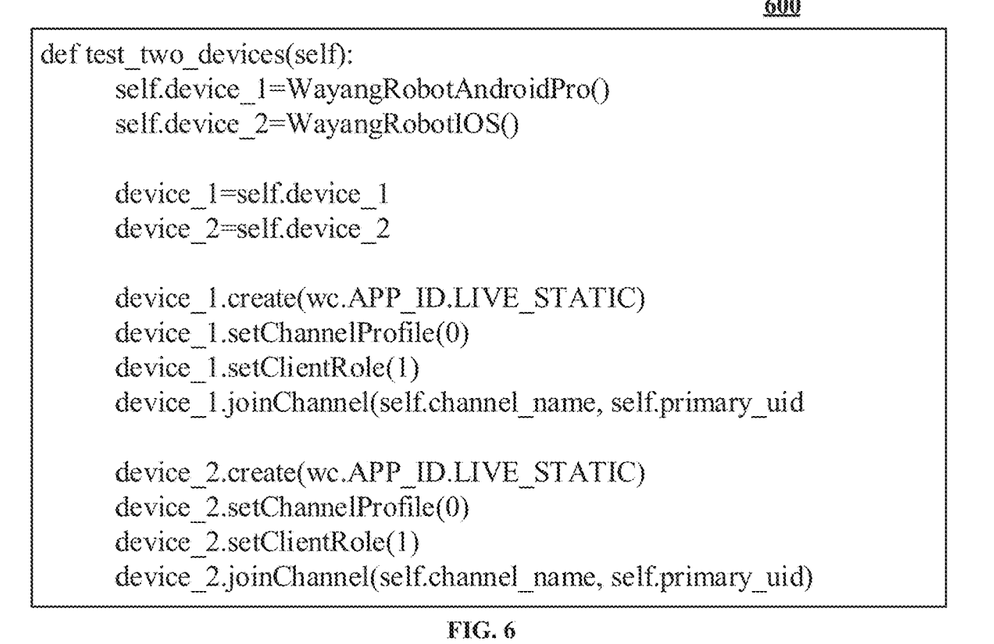
FIG. 6 is an illustrative SDK testing use case in accordance with this disclosure.

In FIG. 6, a testing case 600 for testing the same set of APIs on two different target devices is shown. FIG. 7 shows a testing case 700 for testing two different sets of APIs on two different target devices is shown. FIG. 8 shows a testing case 800 for testing three different sets of APIs on four different target devices is shown. The four sets of APIs on the four different target devices are not the same. The first set of APIs is to be tested on device_1; the second set of APIs is to be tested on device_2; and the third set of APIs is to be tested on both device_3 and device_4. Each set of APIs is transformed into a set of automated SDK testing command messages in the format of, for example, JavaScript Object Notation (JSON) messages. The sets of automated SDK testing command messages are sent to the server 204, which then forwards them to the respective automated SDK testing target devices 302-310.

A testing case can be easily programmed to test any APIs on any number of target devices. The tested APIs can be the same or different for the different target devices. Since any number of devices can be specified in the testing case, the system 200 is thus highly scalable. Furthermore, since the testing is executed concurrently, the testing system 200 is highly efficient. In addition, since the testing use cases 600, 700 and 800 can be easily and conveniently programmed, the testing system 200 overcomes the shortcomings of conventional UI based testing paradigm.

Figure 9:
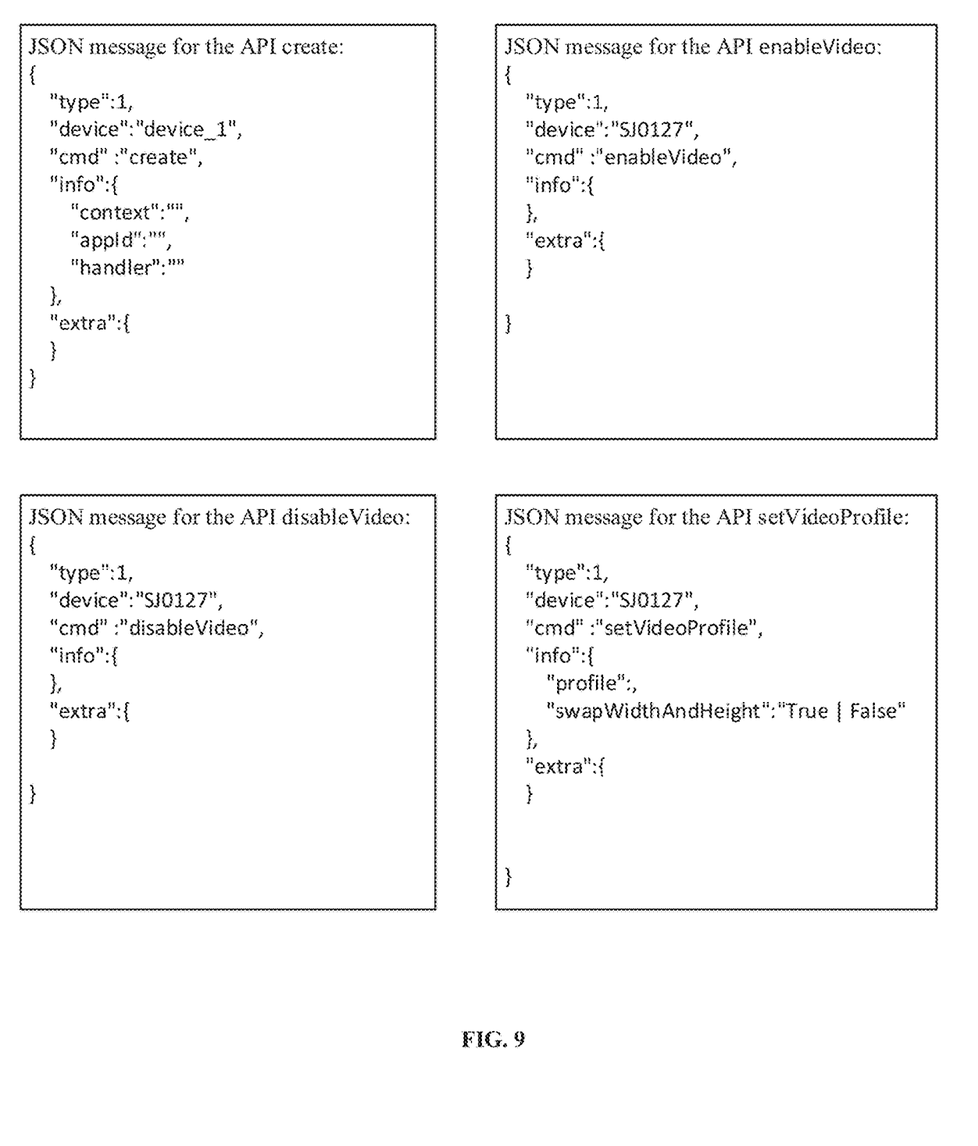
FIG. 9 are illustrative SDK testing command messages in accordance with this disclosure.

Turning back to FIG. 5, at 504, the controller 202 transforms the SDK testing use case into a set of automated SDK testing command messages. For example, the APIs create, enableVideo, disableVideo and setVideoProfile are transformed into the command messages shown in FIG. 9. In one implementation, the command messages are in the form of JSON messages. Each command message within the set of command messages may be targeted to each of the target devices 302-310. It is also possible that different subsets of testing messages within the set are for different target devices within the set of devices 302-310.

At 406, the server 204 forwards the set of testing command messages to the server 204. At 408, the server 204 forwards each message within the set of testing command messages to its target device within the set of the subscriber devices 302-310. At 506, the elements 414 and 416 are performed.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A highly scalable system for automated testing of a Software Development Kit (SDK), said highly scalable system comprising:
   1) an automated testing controller, said automated testing controller being a computer program adapted to be executed on an automated SDK testing controller computer and stored in a memory of said automated SDK testing controller computer, said automated SDK testing controller computer including:
      a) a hardware processor;
      b) a memory operatively coupled to said hardware processor;
      c) a networking interface operatively coupled to said hardware processor for accessing the Internet;
      d) a display screen operatively coupled to said hardware processor; and,
      e) a user input interface operatively coupled to said hardware processor;
   2) an automated testing message server, said automated testing message server being a server computer software application running on a server computer;
   3) an automated testing message terminal adapted to be executed on a set of automated testing target devices, said set of automated testing target devices including at least two automated testing target devices, said automated testing message terminal being a computer software program, said automated testing message terminal further adapted to communicate with the automated testing message server; and
   4) wherein:
      a) said automated testing controller is adapted to register with said automated testing message server as an automated SDK testing controller over the Internet;
      b) said automated testing message terminal is adapted to register with said automated testing message server over the Internet from said set of automated testing target devices;
      c) said automated testing controller is adapted to program an automated testing use case calling a set of Application Programming Interfaces (APIs) on each automated testing target device within said set of automated testing target devices, thereby forming a list of sets of APIs;
      d) said automated testing controller is adapted to transform each set of APIs within said list of sets of APIs into a set of automated SDK testing command messages as JavaScript Object Notation (JSON) messages, thereby forming a list of sets of JSON messages;
      e) said automated testing controller is adapted to send said list of sets of JSON messages to said automated testing message server over the Internet;
      f) said automated testing message server is adapted to forward each set of JSON messages within said list of sets of JSON messages to said automated testing message terminal running on a corresponding automated testing target device within said set of automated testing target devices over the Internet;
      g) on each automated testing target device within said set of automated testing target devices, said automated testing message terminal is adapted to call a corresponding set of APIs within said list of sets of APIs against said SDK, wherein said SDK is adapted to execute said set of APIs by said SDK to generate a result;
      h) said automated testing message terminal is adapted to return said result to said automated testing message server over the Internet;
      i) said automated testing message server is adapted to forward said result to said automated testing controller, thereby forming a set of results; and
      j) said automated testing controller is adapted to process said set of results.

2. The highly scalable system of claim 1 wherein said sets of APIs within said list of sets of APIs are not the same.

3. The highly scalable system of claim 2 wherein two or more sets of APIs within said list of sets of APIs are the same.

4. The highly scalable system of claim 1 wherein said sets of APIs within said list of sets of APIs are the same.

5. The highly scalable system of claim 1 wherein said set of automated testing target devices includes at least one automated testing target device that is an Internet of Things device.

6. The highly scalable system of claim 1 wherein said set of automated testing target devices includes at least one automated testing target device that is an Android device, an iOS device, a Windows device, or an iPadOS device.

7. A highly scalable system for automated testing of a Software Development Kit (SDK), said highly scalable system comprising:
   1) an automated testing controller, said automated testing controller being a computer program adapted to be executed on an automated SDK testing controller computer and stored in a memory of said automated SDK testing controller computer, said automated SDK testing controller computer including:
      a) a hardware processor;
      b) a memory operatively coupled to said hardware processor; c) a networking interface operatively coupled to said hardware processor for accessing the Internet;
      d) a display screen operatively coupled to said hardware processor; and,
      e) a user input interface operatively coupled to said hardware processor;
   2) an automated testing message server, said automated testing message server being a server computer software application running on a server computer;
   3) an automated testing message terminal adapted to be executed on a set of automated testing target devices, said set of automated testing target devices including at least two automated testing target devices, said automated testing message terminal being a computer software program, said automated testing message terminal further adapted to communicate with the automated testing message server; and
   4) wherein:
      a) said automated testing controller is adapted to register with said automated testing message server as an automated SDK testing controller over the Internet;

b) said automated testing message terminal is adapted to register with said automated testing message server over the Internet from said set of automated testing target devices;
c) said automated testing controller is adapted to program an automated testing use case calling a set of Application Programming Interfaces (APIs) on each automated testing target device within said set of automated testing target devices, thereby forming a list of sets of APIs;
d) said automated testing controller is adapted to transform each set of APIs within said list of sets of APIs into a set of automated SDK testing command messages;
e) said automated testing controller is adapted to send said list of sets of automated SDK testing command messages to said automated testing message server over the Internet;
f) said automated testing message server is adapted to forward each set of automated SDK testing command messages within said list of sets of automated SDK testing command messages to said automated testing message terminal running a corresponding automated testing target device within said set of automated testing target devices over the Internet;
g) on each automated testing target device within said set of automated testing target devices, said automated testing message terminal is adapted to call a corresponding set of APIs within said list of sets of APIs against said SDK, wherein said SDK is adapted to concurrently execute said set of APIs by said to generate a result;
h) said automated SDK testing message terminal is adapted to return said result to said automated testing message server over the Internet;
i) said automated SDK testing message server is adapted to forward said result to said automated testing controller, thereby forming a set of results; and
j) said automated SDK testing controller is adapted to process said set of results.

8. The highly scalable system of claim 7 wherein said sets of APIs within said list of sets of APIs are not the same.

9. The highly scalable system of claim 8 wherein two or more sets of APIs within said list of sets of APIs are the same.

10. The highly scalable system of claim 7 wherein said sets of APIs within said list of sets of APIs are the same.

11. The highly scalable system of claim 7 wherein said set of automated testing target devices includes at least one automated testing target device that is an Internet of Things device.

12. The highly scalable system of claim 7 wherein said set of automated testing target devices includes at least one automated testing target device that is an Android device, an iOS device, a Windows device, or an iPadOS device.

13. The highly scalable system of claim 7 wherein each automated SDK testing command message within said list of sets of automated SDK testing command messages is a JavaScript Object Notation (JSON) message.

\* \* \* \* \*